United States Patent [19]
McGarrity

[11] Patent Number: 6,042,629
[45] Date of Patent: Mar. 28, 2000

[54] FERTILIZER FROM BREWERY CLEANING AND RINSING SOLUTIONS

[75] Inventor: Michael Jerome McGarrity, London, Canada

[73] Assignee: Labatt Brewing Company Limited, London, Canada

[21] Appl. No.: 09/001,661

[22] Filed: Dec. 31, 1997

[51] Int. Cl.⁷ .......................... A01N 25/00; C05B 11/00; C05F 5/00; B08B 3/00; B09B 1/00

[52] U.S. Cl. ...................... 71/25; 71/64.1; 71/43; 71/26; 134/27; 134/28; 134/29; 405/128; 405/263; 405/264; 423/659; 428/592; 99/277.1

[58] Field of Search .................. 71/28.3, 64.07, 71/902, 64.1, 29, 43, 26, 34, 25; 405/128, 263, 264; 423/659; 134/27, 28, 29

[56] References Cited

U.S. PATENT DOCUMENTS 4,043,936  8/1977  Francis et al. ........................ 252/301.1

FOREIGN PATENT DOCUMENTS 107705  3/1985  Japan .............................. C02F 11/16

OTHER PUBLICATIONS

Ajmal, Mohammad, Effects of Brewery Effluent on Agricultural Soil and Crop Plants, Environ Pollution Service, pp. 341–351, 1984.

*Primary Examiner*—Gary P. Straub
*Assistant Examiner*—Melanie C. Wong
*Attorney, Agent, or Firm*—Levy & Grandinetti

[57] ABSTRACT

A process provides for the production of fertilizer solutions from brewery cleaning solutions. The process comprises the steps of combining a brewery caustic potash cleaning solution with a brewery nitrogen- or phosphorus-containing acid cleaning solution in mutually neutralizing amounts. This process results in the production of a fertilizer solution comprising a neutralized potassium salt solution having nitrogen-containing, organic, brewing materials entrained therein. If desired, spent grains and/or spent yeast from the brewing process can be added to provide further nutrients.

39 Claims, No Drawings

FERTILIZER FROM BREWERY CLEANING AND RINSING SOLUTIONS

BACKGROUND OF THE INVENTION

1. Field of the Invention

The present invention relates to the production of fertilizer from brewery cleaning solutions.

2. Description of Background Art

The manufacture of fertilizer from waste materials is well known.

Japanese patent 50149136 relates to a process for treating sewage for fertilizer production, in which caustic alkali is used to dissolve fats, proteins, etc. Following filtration, the filtrate is mixed with lime slurry, and the precipitate that forms is then used as a fertilizer.

Japanese patent 79020425 to Katakura Chikkarin Co., Ltd., discloses a composition that is prepared by diluting an alcohol-fermentation molasses waste liquor, then dissolving urea, water-soluble ammonium salts, nitrate, sulfate, chloride, and phosphoric acid therein while stirring—and finally reacting the mixture with caustic potash.

In the case of brewery wastes, in particular, it is known (according to Japanese patent 89027038) that the addition of a small amount of a distillate derived from Ternstroemiaceae plants to beer lees can produce a fertilizer having reduced odors.

Japanese patent 58208191 discloses a soil activator composition by adding a Bacillus culture and an Actinomycetes strain culture to a protein nitrogen source, such as dry beer yeast waste, and a humic acid containing material, such as peat or lignite.

U.S. Pat. No. 4,579,579 discloses a process for the preparation of slow-release fertilizer comprising the steps of:

(a) grinding a first volume of peanut hulls to a particle size of 1/32 to ½ inch and a second volume to ⅜ to ½ inch, (b) treating the first volume of hulls with an equal volume of 2N nitric acid for 30 minutes at 121° C. and 15 p.s.i. pressure to extract and solubilize the liquid material from the hulls, (c) adding one volume of one normal solubilized sodium hydroxide to two volumes of the second volume of peanut hulls and heating and stirring the mixture until the nutrients are solubilized, (d) heating the second volume of peanut hulls and sodium hydroxide with steam and at a temperature of 121° C. and pressure of 15 p.s.i. for 30 minutes to open the fibers of the hulls, (e) adding fertilizer nutrients, such as commercially available potash, super phosphate, or other source of phosphate and ammonium nitrate or other source of nitrogen, to liquid waste material from the beer brewing industry containing either live or autolyzed yeast or other biological waste material, (f) drying the heat-treated peanut hulls, whereby the fibers of the hulls close, entrapping the nutrients and the waste material, (g) soaking the dried, impregnated hulls with the lignin-containing liquid from step (b), and (h) drying the peanut hulls.

SUMMARY OF THE INVENTION

The present invention is directed to fertilizer and to a process for its preparation from brewery waste products.

More particularly, the present invention is directed to a process for the production of fertilizer solutions from brewery cleaning solutions, comprising the steps of combining a brewery caustic potash cleaning solution with a brewery nitrogen- or phosphorus-containing acid cleaning solution in mutually neutralizing amounts thereof to produce a fertilizer solution comprising a neutralized potassium salt having nitrogen-containing, organic, brewing materials contained therein.

Preferably, the present invention is directed to a process for the production of fertilizer solutions from brewery cleaning solutions, comprising the steps of combining spent brewery caustic potash cleaning solution with spent brewery phosphoric acid cleaning solution in mutually neutralizing amounts thereof to produce a fertilizer solution comprising neutralized potassium phosphate having nitrogen-containing, organic, brewing materials contained therein.

In a more preferred embodiment, the present invention is directed to a process for preparing fertilizer from the waste products of a brewing process comprising the steps of:

draining the brewing equipment of liquid brewing product;

treating residual brewing products remaining in those portions of the drained brewing equipment containing carbon dioxide with a cleaning solution comprising phosphoric acid;

treating residual brewing products remaining in those portions of the drained brewing equipment not containing carbon dioxide with a cleaning solution comprising caustic potash;

the residual brewing products comprising atoms selected from the group consisting of nitrogen, carbon, and mixtures thereof;

then, neutralizing the cleaning solution comprising phosphoric acid with the cleaning solution comprising caustic potash;

whereby a fertilizer solution comprising potassium phosphate and the treated residual brewing products is formed.

In another preferred embodiment the process further comprises the step of mixing the fertilizer solution with spent grains from the brewing process.

In another aspect, the present invention is directed to a brewery clean-in-place process for cleaning brewery equipment, comprised of subjecting portions of the equipment containing carbon dioxide to a nitrogen- or phosphorus-containing acid cleaning solution and subjecting portions of the equipment not containing carbon dioxide to a caustic potash cleaning solution, then combining the nitrogen- or phosphorus-containing acid cleaning solution with the caustic potash cleaning solution in mutually neutralizing amounts to produce a fertilizer solution comprising a neutralized potassium salt solution having nitrogen-containing, organic brewing materials contained therein.

Preferably, the present invention is directed to a brewery clean-in-place process for cleaning brewery equipment, the process comprising subjecting portions of the equipment containing carbon dioxide to a phosphoric acid cleaning solution and subjecting portions of the equipment not containing carbon dioxide to a caustic potash cleaning solution, then combining spent phosphoric acid cleaning solution with spent caustic potash cleaning solution in mutually neutralizing amounts to produce a fertilizer solution comprising a neutralized potassium phosphate solution having nitrogen-containing, organic brewing materials contained therein.

In still another aspect, the present invention is directed to a fertilizer prepared by a process comprised of:

combining brewery caustic potash cleaning solution with brewery nitrogen- or phosphorus-containing acid cleaning solution in mutually neutralizing amounts to produce a fertilizer solution comprising a potassium salt having nitrogen-containing, organic, brewing materials contained therein.

Preferably, the present invention is directed to a fertilizer prepared by a process comprised of:

combining spent brewery caustic potash cleaning solution with spent brewery phosphoric acid cleaning solution in mutually neutralizing amounts to produce a fertilizer solution comprising potassium phosphate having nitrogen-containing, organic, brewing materials contained therein.

In another preferred embodiment, the present invention is directed to a fertilizer prepared by a process comprised of:

draining the brewing equipment of liquid brewing product;

treating residual brewing products remaining in those portions of the drained brewing equipment containing carbon dioxide with a cleaning solution comprising phosphoric acid;

treating residual brewing products remaining in those portions of the drained brewing equipment not containing carbon dioxide with a cleaning solution comprising caustic potash;

the residual brewing products comprising atoms selected from the group consisting of nitrogen, carbon, and mixtures thereof;

then, neutralizing the cleaning solution comprising phosphoric acid with the cleaning solution comprising caustic potash;

whereby a fertilizer solution comprising potassium phosphate and the treated residual brewing products is formed.

DESCRIPTION OF THE PREFERRED EMBODIMENTS

Any number of exemplary processes for producing fermented malt beverages such as beer, ale, porter, malt liquor and other similar fermented alcoholic brewery beverages (hereinafter referred to simply as "beer" for convenience), are historically well established.

As practiced in modern breweries, such a process typically comprises preparing, in a vessel called a mash tun, a "mash" of malt, usually with cereal adjuncts, and heating the mash to solubilize the proteins and convert the starch into sugar and dextrins. The insoluble grains are filtered off and rinsed with hot water in another vessel called a lauter tun. The resulting wort is then boiled in a brew kettle to inactivate enzymes, sterilize the wort, extract desired hop components from added hops, and coagulate certain protein-like substances. The wort is then strained to remove spent hops and coagulate in a hop strainer, whereafter it is cooled, pitched with yeast and fermented in a fermentor. The fermented brew known as "green" or "ruh" beer is then aged ("lagered") in aging tanks and then clarified, filtered, and carbonated to produce the desired beer.

In any case, all of this brewing equipment and the vast interconnecting network of beer conduits must be cleaned from time to time. A preferred practice entails a "cip" or clean-in-place approach. This means passing a caustic soda (i.e., sodium hydroxide) cleaning solution through the various vessels and attendant piping, draining the cleaning solution away, and then rinsing the washed equipment surfaces with water. The spent caustic soda cleaning solution must then be disposed of.

Some tanks and lines of the brewing process, e.g., aging tanks, surge tanks used in the filtration, bright beer tanks, and tanks used in packaging, are filled with carbon dioxide, which permits the tanks to be filled without adding oxygen to the beer. If these tanks and lines were to be rinsed with caustic soda, the carbon dioxide in them would react with the caustic soda to produce sodium carbonate, creating a danger of tank implosion. Accordingly, in such tanks and lines, an acid cleaning solution is used as a substitute for the caustic soda cleaning solution used in other tanks and lines. The acid cleaning solution is normally a phosphoric acid cleaning solution, although nitric acid could also be used.

In accordance with the present invention, a caustic potash cleaning solution is substituted for the caustic soda cleaning solution previously used. Caustic potash comprises potassium hydroxide, which can be pure, but which frequently includes additional substances as impurities that do not significantly affect its alkaline nature. Caustic soda (also known simply as "caustic") is a similar substance. But it is primarily, if not wholly, sodium hydroxide.

In either case, whether caustic soda or caustic potash is used, the cleaning effect they produce in the brewing equipment is substantially the same. Residual materials remaining in the equipment after it has been drained will be washed away. Most of such materials will be insolubles introduced into the equipment during the brewing process, and these insolubles will be solubilized by the strong base by known chemical reactions, e.g. hydrolysis, denaturation, neutralization (as of fatty acids), and the like. Those skilled in the art will realize that small amounts of soluble substances will also possibly be present, depending upon the efficiency of the draining process, and these substances will naturally also be washed away by the cleaning solution by simple dilution.

The strongly basic cleaning solution is drained from the brewing equipment, leaving behind residual base, which is normally rinsed from the system with water. Similarly, the phosphoric acid customarily used in the carbon dioxide tanks and lines is drained, and residual acid is rinsed from the equipment with water.

After draining, the alkaline cleaning solution that has been drained from the equipment must also be rendered harmless by the addition of a neutralizing amount of phosphoric acid. This process will create more phosphate salt. If desired, nitric acid can be substituted for the phosphoric acid, thereby yielding nitrate salt. The use of nitric acid, however, although operable in the performance of the present invention, is not recommended. The presence of nitric acid in the system presents a definite safety hazard. If handled in such a way that the nitric acid may come into contact with materials, e.g., certain organic materials, that can be nitrated, such contact may give rise to a very high exotherm that could result in a violent explosion. Therefore, the use of phosphoric acid in the practice of the present invention is much preferred and, again, the use of nitric acid is not recommended.

When the cleaning solution of the prior art, caustic soda, is used, the neutralization product is sodium phosphate, a substance of little value. The sodium phosphate presents a problem with regard to appropriate disposal. However, when the cleaning solution is the caustic potash of the present invention, the neutralization product is potassium phosphate, or potassium nitrate if nitric acid is used, both of which are of commercial value as a fertilizer. Either of these salts will carry along the residual products of the brewing process that the cleaning solution carried with it from the cleaning process. These residual products are rich in nitrogen and carbon, elements that add to the efficacy of the neutralized product for fertilizer purposes.

Thus, in one aspect of the present invention, a process is provided which comprises the steps of combining spent brewery caustic potash cleaning solution with spent brewery phosphoric acid cleaning solution. The amounts of each are selected to be mutually neutralizing in their resulting admixture. This process produces a fertilizer solution comprising neutralized potassium phosphate having nitrogen-containing, organic, brewing materials contained therein. Those skilled in the art will realize, of course, that stoichiometric amounts of the two spent cleaning solutions are unlikely to be produced in the process and, thus, additional quantities of the substance present in lesser amounts will be added to complete the neutralization.

In accordance with another aspect of the present invention, there is provided a brewery clean-in-place process for cleaning brewery equipment. This process preferably comprises subjecting the brewing equipment that is free from carbon dioxide to a caustic potash cleaning solution. The caustic potash solubilizes residual fats, proteins, and the like, that are present on the equipment surfaces being cleaned.

Once the equipment surfaces have been washed with the caustic potash solution, the spent caustic potash is permitted to flow off. This is followed by rinsing the equipment surfaces with water, as described above.

Then the spent caustic potash cleaning solution is combined with the spent phosphoric acid rinse solution from those tanks and lines of the brewing process containing carbon dioxide in mutually neutralizing amounts. This combination neutralizes the pH of the spent caustic potash, which must be accomplished in any event, even if the neutralized matter is to be disposed in the customary waste drains. In the present process, however, this step results in a fertilizer comprising neutralized potassium phosphate solution that has picked up nitrogen-containing and/or carbon-containing, organic, brewing materials during the cleaning process. Such materials are derived from tannins, proteins, natural fatty acids, hop resins, various constituents thereof, and the like, and are all natural organic materials.

Additionally, if desired, spent yeast and/or spent grains (being high in nitrogen and nitrogen plus carbon, respectively), can be added to supplement further the nitrogen and carbon (soil building) concentrations of the fertilizer product.

Thus, the present invention is directed to a process for preparing fertilizer from the waste products of a brewing process comprising the steps of:

draining the brewing equipment of liquid brewing product;

treating residual brewing products remaining in those portions of the drained brewing equipment containing carbon dioxide with a cleaning solution comprising phosphoric acid;

treating residual brewing products remaining in those portions of the drained brewing equipment not containing carbon dioxide with a cleaning solution comprising caustic potash;

the residual brewing products comprising atoms selected from the group consisting of nitrogen, carbon, and mixtures thereof;

then, neutralizing the cleaning solution comprising phosphoric acid with the cleaning solution comprising caustic potash;

whereby a fertilizer solution comprising potassium phosphate and the treated residual brewing products is formed.

In a preferred embodiment, the present invention is directed to a process for preparing fertilizer from the waste products of a brewing process comprising the steps of:

draining the brewing equipment of liquid brewing product;

treating residual brewing products remaining in those portions of the drained brewing equipment containing carbon dioxide with a cleaning solution comprising phosphoric acid, the residual brewing products comprising atoms selected from the group consisting of nitrogen, carbon, and mixtures thereof;

draining the brewing equipment of spent phosphoric acid cleaning solution containing residual brewing products treated therewith;

treating residual brewing products remaining in those portions of the drained brewing equipment not containing carbon dioxide with a cleaning solution comprising caustic potash, the residual brewing products comprising atoms selected from the group consisting of nitrogen, carbon, and mixtures thereof;

draining the brewing equipment of spent caustic potash cleaning solution containing residual brewing products treated therewith;

combining and neutralizing the spent phosphoric acid cleaning solution and the spent caustic potash cleaning solution;

whereby a fertilizer solution comprising potassium phosphate and the treated residual brewing products is formed.

Thereafter, the fertilizer solution can be sprayed as is or concentrated. If desired, it can also be incorporated into a matrix or carrier of the kind well-known in the fertilizer art (see, for example, U.S. Pat. No. 4,579,579 and the prior art references described therein, incorporated herein by reference). Spent grains and/or spent yeast from the brewing process can, if desired, also be added to provide further nutrients.

In view of the many changes and modifications that can be made without departing from principles underlying the invention, reference should be made to the appended claims for an understanding of the scope of the protection afforded the invention.

What is claimed is:

1. A process for the production of fertilizer solutions from brewery cleaning solutions, comprising the steps of combining a brewery caustic potash cleaning solution with a brewery phosphorus-containing acid cleaning solution in mutually neutralizing amounts to produce a fertilizer solution comprising a neutralized potassium salt having nitrogen-containing, organic, brewing materials contained therein.

2. The process of claim 1 wherein the brewery caustic potash cleaning solution is spent brewery caustic potash cleaning solution.

3. The process of claim 1 wherein the phosphorus-containing acid cleaning solution is spent phosphorus-containing acid cleaning solution.

4. The process of claim 1 wherein the phosphorus-containing acid cleaning solution is a phosphoric acid cleaning solution.

5. A process for the production of fertilizer solutions from brewery cleaning solutions comprising the steps of combining spent brewery caustic potash cleaning solution with spent brewery phosphoric acid cleaning solution in mutually neutralizing amounts to produce a fertilizer solution comprising neutralized potassium phosphate having nitrogen-containing, organic, brewing materials contained therein.

6. A process for preparing fertilizer from the waste products of a brewing process comprising the steps of:
- draining the brewing equipment of liquid brewing product;
- treating residual brewing products remaining in those portions of the drained brewing equipment containing carbon dioxide with a cleaning solution comprising phosphoric acid;
- treating residual brewing products remaining in those portions of the drained brewing equipment not containing carbon dioxide with a cleaning solution comprising caustic potash;
- said residual brewing products comprising atoms selected from the group consisting of nitrogen, carbon, and mixtures thereof;
- then, neutralizing the cleaning solution comprising phosphoric acid with the cleaning solution comprising caustic potash;
- whereby a fertilizer solution comprising potassium phosphate and the treated residual brewing products is formed.

7. The process of claim 6 further comprising the step of mixing the fertilizer solution with spent grains from the brewing process.

8. The process of claim 7 further comprising the step of mixing the fertilizer solution with spent yeast from the brewing process.

9. The process of claim 6 further comprising the step of mixing the fertilizer solution with spent yeast from the brewing process.

10. A process for preparing fertilizer from the waste products of a brewing process comprising the steps of:
- draining the brewing equipment of liquid brewing product;
- treating residual brewing products remaining in those portions of the drained brewing equipment containing carbon dioxide with a cleaning solution comprising phosphoric acid, said residual brewing products comprising atoms selected from the group consisting of nitrogen, carbon, and mixtures thereof;
- draining the brewing equipment of spent phosphoric acid cleaning solution containing residual brewing products treated therewith;
- treating residual brewing products remaining in those portions of the drained brewing equipment not containing carbon dioxide with a cleaning solution comprising caustic potash, said residual brewing products comprising atoms selected from the group consisting of nitrogen, carbon, and mixtures thereof;
- draining the brewing equipment of spent caustic potash cleaning solution containing residual brewing products treated therewith;
- combining and neutralizing the spent phosphoric acid cleaning solution and the spent caustic potash cleaning solution;
- whereby a fertilizer solution comprising potassium phosphate and the treated residual brewing products is formed.

11. The process of claim 10 further comprising the step of mixing the fertilizer solution with spent grains from the brewing process.

12. The process of claim 11 further comprising the step of mixing the fertilizer solution with spent yeast from the brewing process.

13. The process of claim 10 further comprising the step of mixing the fertilizer solution with spent yeast from the brewing process.

14. A brewery clean-in-place process for cleaning brewery equipment, said process comprising subjecting portions of said equipment containing carbon dioxide to a phosphorus-containing acid cleaning solution and subjecting portions of said equipment not containing carbon dioxide to a caustic potash cleaning solution, then combining the phosphorus-containing acid cleaning solution with the caustic potash cleaning solution in mutually neutralizing amounts to produce a fertilizer solution comprising a neutralized potassium salt solution having nitrogen-containing, organic brewing materials contained therein.

15. The process of claim 14 wherein the brewery caustic potash cleaning solution is spent brewery caustic potash cleaning solution.

16. The process of claim 14 wherein the phosphorus-containing acid cleaning solution is spent phosphorus-containing acid cleaning solution.

17. The process of claim 14 wherein the phosphorus-containing acid cleaning solution is a phosphoric acid cleaning solution.

18. A brewery clean-in-place process for cleaning brewery equipment, said process comprising subjecting portions of the equipment containing carbon dioxide to a phosphoric acid cleaning solution and subjecting portions of the equipment not containing carbon dioxide to a caustic potash cleaning solution, then combining spent phosphoric acid cleaning solution with spent caustic potash cleaning solution in mutually neutralizing amounts to produce a fertilizer solution comprising a neutralized potassium phosphate solution having nitrogen-containing, organic brewing materials contained therein.

19. A brewery clean-in-place process for cleaning brewery equipment, said process comprising the steps of:
- draining the brewing equipment of liquid brewing product;
- treating residual brewing products remaining in those portions of the drained brewing equipment containing carbon dioxide with a cleaning solution comprising phosphoric acid;
- treating residual brewing products remaining in those portions of the drained brewing equipment not containing carbon dioxide with a cleaning solution comprising caustic potash;
- the residual brewing products comprising atoms selected from the group consisting of nitrogen, carbon, and mixtures thereof;
- then, neutralizing the cleaning solution comprising phosphoric acid with the cleaning solution comprising caustic potash;
- whereby a fertilizer solution comprising potassium phosphate and the treated residual brewing products is formed.

20. The process of claim 19 further comprising the step of mixing the fertilizer solution with spent grains from the brewing process.

21. The process of claim 20 further comprising the step of mixing the fertilizer solution with spent yeast from the brewing process.

22. The process of claim 19 further comprising the step of mixing the fertilizer solution with spent yeast from the brewing process.

23. A brewery clean-in-place process for cleaning brewery equipment, the process comprising the steps of:
draining the brewing equipment of liquid brewing product;
treating residual brewing products remaining in those portions of the drained brewing equipment containing carbon dioxide with a cleaning solution comprising phosphoric acid, the residual brewing products comprising atoms selected from the group consisting of nitrogen, carbon, and mixtures thereof;
draining the brewing equipment of spent phosphoric acid cleaning solution containing residual brewing products treated therewith;
treating residual brewing products remaining in those portions of the drained brewing equipment not containing carbon dioxide with a cleaning solution comprising caustic potash, the residual brewing products comprising atoms selected from the group consisting of nitrogen, carbon, and mixtures thereof;
draining the brewing equipment of spent caustic potash cleaning solution containing residual brewing products treated therewith;
combining and neutralizing the spent phosphoric acid cleaning solution and the spent caustic potash cleaning solution;
whereby a fertilizer solution comprising potassium phosphate and the treated residual brewing products is formed.

24. The process of claim 23 further comprising the step of mixing the fertilizer solution with spent grains from the brewing process.

25. The process of claim 24 further comprising the step of mixing the fertilizer solution with spent yeast from the brewing process.

26. The process of claim 23 further comprising the step of mixing the fertilizer solution with spent yeast from the brewing process.

27. A fertilizer prepared by a process comprising:
combining brewery caustic potash cleaning solution with brewery phosphorus-containing acid cleaning solution in mutually neutralizing amounts to produce a fertilizer solution comprising a potassium salt having nitrogen-containing, organic, brewing materials contained therein.

28. The fertilizer of claim 27 wherein the brewery caustic potash cleaning solution is spent brewery caustic potash cleaning solution.

29. The fertilizer of claim 27 wherein the phosphorus-containing acid cleaning solution is spent phosphorus-containing acid cleaning solution.

30. The fertilizer of claim 27 wherein the phosphorus-containing acid cleaning solution is a phosphoric acid cleaning solution.

31. A fertilizer prepared by a process comprising:
combining spent brewery caustic potash cleaning solution with spent brewery phosphoric acid cleaning solution in mutually neutralizing amounts to produce a fertilizer solution comprising potassium phosphate having nitrogen-containing, organic, brewing materials contained therein.

32. A fertilizer prepared by a process comprising:
draining the brewing equipment of liquid brewing product;
treating residual brewing products remaining in those portions of the drained brewing equipment containing carbon dioxide with a cleaning solution comprising phosphoric acid;
treating residual brewing products remaining in those portions of the drained brewing equipment not containing carbon dioxide with a cleaning solution comprising caustic potash;
the residual brewing products comprising atoms selected from the group consisting of nitrogen, carbon, and mixtures thereof;
then, neutralizing the cleaning solution comprising phosphoric acid with the cleaning solution comprising caustic potash;
whereby a fertilizer solution comprising potassium phosphate and the treated residual brewing products is formed.

33. The fertilizer of claim 32 wherein the process further comprises the step of mixing the fertilizer solution with spent grains from the brewing process.

34. The fertilizer of claim 33 wherein the process further comprises the step of mixing the fertilizer solution with spent yeast from the brewing process.

35. The fertilizer of claim 32 wherein the process further comprises the step of mixing the fertilizer solution with spent yeast from the brewing process.

36. A fertilizer prepared by a process comprising:
draining the brewing equipment of liquid brewing product;
treating residual brewing products remaining in those portions of the drained brewing equipment containing carbon dioxide with a cleaning solution comprising phosphoric acid, the residual brewing products comprising atoms selected from the group consisting of nitrogen, carbon, and mixtures thereof;
draining the brewing equipment of spent phosphoric acid cleaning solution containing residual brewing products treated therewith;
treating residual brewing products remaining in those portions of the drained brewing equipment not containing carbon dioxide with a cleaning solution comprising caustic potash, the residual brewing products comprising atoms selected from the group consisting of nitrogen, carbon, and mixtures thereof;
draining the brewing equipment of spent caustic potash cleaning solution containing residual brewing products treated therewith;
combining and neutralizing the spent phosphoric acid cleaning solution and the spent caustic potash cleaning solution;
whereby a fertilizer solution comprising potassium phosphate and the treated residual brewing products is formed.

37. The fertilizer of claim 36 wherein the process further comprises the step of mixing the fertilizer solution with spent grains from the brewing process.

38. The fertilizer of claim 37 wherein the process further comprises the step of mixing the fertilizer solution with spent yeast from the brewing process.

39. The fertilizer of claim 36 wherein the process further comprises the step of mixing the fertilizer solution with spent yeast from the brewing process.

* * * * *